US012682902B2

(12) United States Patent
Chen et al.

(10) Patent No.: US 12,682,902 B2
(45) Date of Patent: Jul. 14, 2026

(54) SPEECH-TO-TEXT PROCESSING ASSISTED WITH LANGUAGE MODELS FOR CONVERSATIONAL AI SYSTEMS AND APPLICATIONS

(71) Applicant: NVIDIA Corporation, Santa Clara, CA (US)

(72) Inventors: Zhehuai Chen, Odessa, FL (US); He Huang, Greenville, SC (US); Oleksii Hrinchuk, Santa Clara, CA (US); Andrei Andrusenko, Yerevan (AM); Venkata Naga Krishna Chaitanya Puvvada, San Jose, CA (US); Subhankar Ghosh, Sunnyvale, CA (US); Jing Yao Li, Ontario (CA); Jagadeesh Balam, Campbell, CA (US); Boris Ginsburg, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 51 days.

(21) Appl. No.: 18/408,400

(22) Filed: Jan. 9, 2024

(65) Prior Publication Data

US 2025/0095652 A1 Mar. 20, 2025

Related U.S. Application Data

(60) Provisional application No. 63/538,741, filed on Sep. 15, 2023.

(51) Int. Cl.

*G10L 15/26* (2006.01)
*G06F 40/58* (2020.01)
*G10L 15/22* (2006.01)

(52) U.S. Cl.

CPC .............. *G10L 15/26* (2013.01); *G06F 40/58* (2020.01)

(58) Field of Classification Search

CPC ...................................................... G10L 15/22
See application file for complete search history.

(56) References Cited

U.S. PATENT DOCUMENTS

2016/0104482 A1* 4/2016 Aleksic ............... G10L 15/1815 704/235
2020/0357388 A1* 11/2020 Zhao ....................... G10L 15/26
2020/0402501 A1* 12/2020 Prabhavalkar ......... G10L 15/187

OTHER PUBLICATIONS

Wu, Jian, et al. "On decoder-only architecture for speech-to-text and large language model integration." 2023 IEEE Automatic Speech Recognition and Understanding Workshop (ASRU). IEEE, Jul. 8, 2023.; retrieved from: https://arxiv.org/abs/2307.03917v1 (Year: 2023).*

(Continued)

*Primary Examiner* — Jialong He
(74) *Attorney, Agent, or Firm* — Lowenstein Sandler LLP

(57) ABSTRACT

Disclosed are apparatuses, systems, and techniques that implement training and deployment of speech-augmented language models for efficient capturing and processing of speech inputs. The techniques include processing, using a speech model, an audio input in a first language to generate a first portion of an input into a language model (LM). A second portion of the input into the LM includes represents a text context associated with the audio input. The techniques further include receiving, from the LM, an output that includes a speech-to-text conversion of the audio input.

19 Claims, 10 Drawing Sheets

(56) References Cited

OTHER PUBLICATIONS

Gulati, Anmol, et al. "Conformer: Convolution-augmented transformer for speech recognition." arXiv preprint arXiv:2005.08100 (2020). (Year: 2020).*
Fathullah, Yassir, et al. "Prompting Large Language Models with Speech Recognition Abilities." arXiv preprint arXiv:2307.11795 (Jul. 2023). (Year: 2023).*

* cited by examiner

500

Process, using a speech model, an audio input to generate 1st portion of an input into a language model (LM)  510

Provide, to the LM, the input into the LM that includes 1st portion and text context associated with the audio input (2nd portion)  520

Receive, from the LM, an output, wherein the output comprises a speech-to-text conversion of the audio input  530

Provide the output to a user  540

Convert, using an adapter neural network, an output of the speech model into tokens of the LM  512

Identify a subject area of the audio input  522

Assemble the text context from entries stored in association with the subject area  524

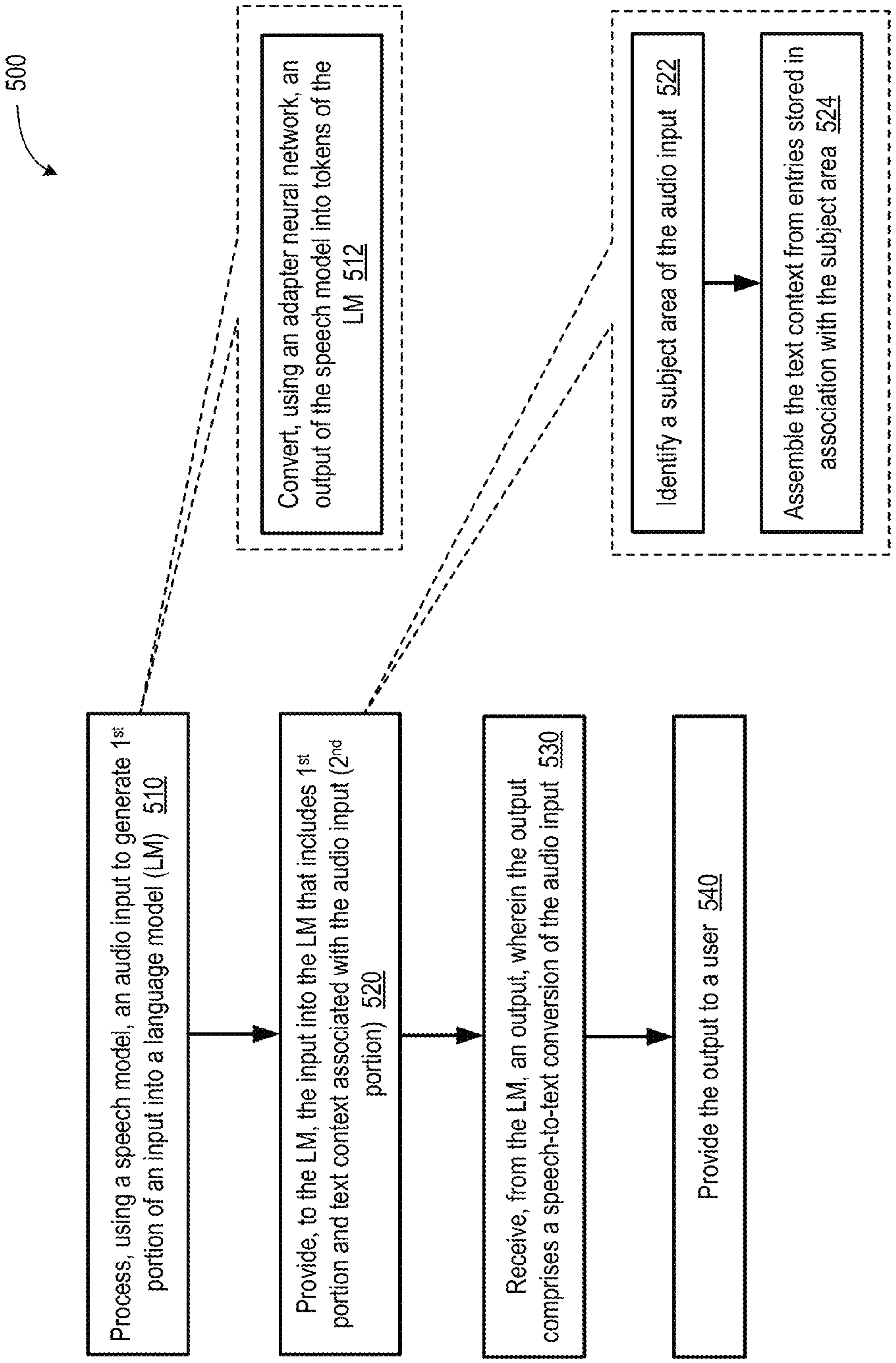

FIG. 5

SPEECH-TO-TEXT PROCESSING ASSISTED WITH LANGUAGE MODELS FOR CONVERSATIONAL AI SYSTEMS AND APPLICATIONS

RELATED APPLICATIONS

This application claims the benefit of U.S. Provisional Patent Application No. 63/538,741, filed Sep. 15, 2023, entitled "SALM: Speech-Augmented Language Model with In-Context Learning for Speech Recognition and Translation," the contents of which are incorporated by reference in their entirety herein.

TECHNICAL FIELD

At least one embodiment pertains to computing resources used to perform and facilitate various speech-to-text processing tasks performed with machine learning, including automatic speech recognition and automatic speech translation. For example, at least one embodiment pertains to the use of language models to facilitate and improve speech-to-text processing operations.

BACKGROUND

Automatic speech recognition (ASR) is a technology that converts spoken language, e.g., detected via an audio recording, into a written text that can be displayed on a screen, printed, stored, used as an input into a conversational model, as an instruction, or in any other way. ASR systems learn to recognize various audio patterns of speech as words of a particular language. ASR systems are commonly deployed in user-facing applications, such as virtual agents, live captioning, clinical notetaking, and the like, and can be trained using speech samples produced by multiple speakers to accurately process different language dialects and accents. Automatic speech translation (AST) is a technology that converts words, phrases, and sentences spoken in a first language into the corresponding speech units in a second language. AST can be performed using ASR to transcribe the spoken words into text followed by machine translation of the transcribed text into the second language or by directly converting spoken words to the second language. ASR and AST are parts of the speech-to-text (S2T) group of technologies. Various S2T systems and techniques can be used alone—e.g., to generate transcriptions and/or other records of speech, e.g., to synthesize new speech—or in conjunction with various text-to-speech (T2S) algorithms, e.g., to carry out natural language conversations.

BRIEF DESCRIPTION OF DRAWINGS

FIG. 5 is a flow diagram of an example method of deploying a speech-augmented language model for efficient capturing and processing of speech inputs, according to at least one embodiment;

DETAILED DESCRIPTION

Figure 1:
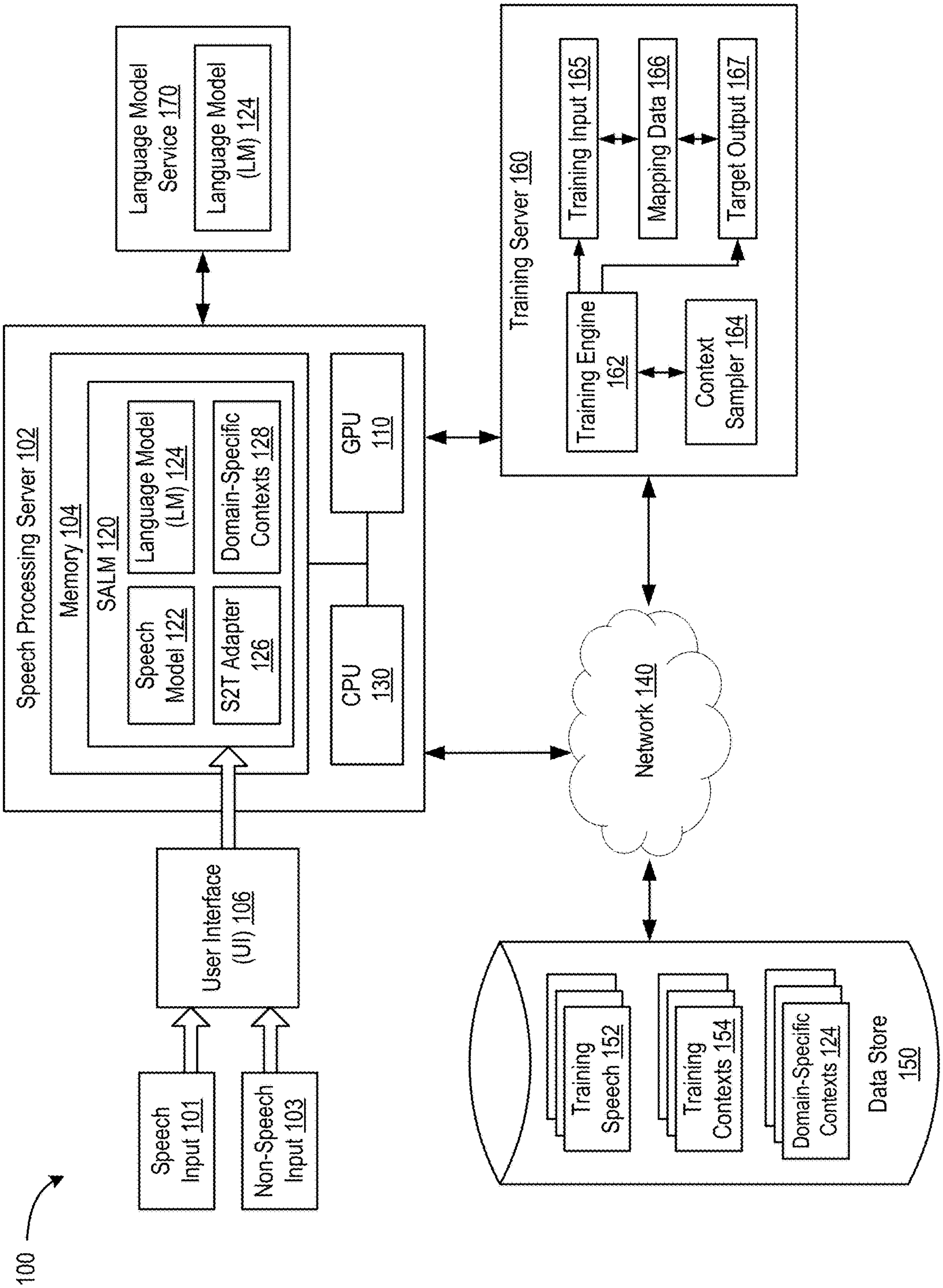
FIG. 1 is a block diagram of an example computer system capable of training and deploying a speech-augmented language model for efficient capturing and processing of speech inputs, according to at least one embodiment.

Large language models (LLMs) have achieved remarkable success in a variety of natural language processing tasks, including supporting conversations in natural language, understanding speaker's intent and emotions, explaining complex topics, generating new texts upon receiving suitable prompts, writing and debugging software codes, providing advice regarding topics of interest to a user, and/or performing other functions. LLMs typically undergo self-supervised training on massive amounts of text data and learn to predict next and/or missing word in a phrase/sentence, detect intent and/or sentiment of a human speaker, determine if two sentences are related or unrelated, and/or perform other basic language tasks. Following the initial training, LLMs often undergo instructional (prompt-based) supervised fine-tuning that causes LLMs to acquire more in-depth language proficiency and/or master more specialized tasks, such as learning financial market literacy, solving mathematical problems, and so on. Fine-tuning can be supervised, e.g., with learning prompts (questions, hints, etc.) accompanied by example texts (e.g., answers, sample essays, etc.) used as ground truth that LLMs try to emulate. Later stages of fine-tuning may also include reinforcement learning, when a human grader assigns marks indicating a degree to which the generated text resembles a human-produced text. Existing LLMs demonstrate in-context learning ability from a low number of representative examples, even when similar examples have not been seen by the LLMs in the previous training.

These learned abilities of LLMs are also attractive for other (than typed text) input modalities, including speech (audio) modalities. In one example, an LLM can receive textual data generated by an ASR model (e.g., a transcribed user's question), process the data and return the response to the use in the form of a reply text or speech (e.g., generated by an additional T2S model). However, converting speech into a text that can be reliably understood and properly processed by an LLM faces some specific challenges. More specifically, some information in the speech can be lost during ASR processing, including accentuated portions of speech, emotional information communicated with the speech, and the like. Additionally, various S2T functionalities, such as ASR and AST, often have to be integrated separately with LLM processing, since converting speech into the same-language transcription may require a type of training that is different from training required for translation of speech into a second language.

Aspects and embodiments of the present disclosure address these and other technological challenges by providing for a speech-augmented language model (SALM) capable of efficiently capturing and processing speech inputs. More specifically, the SALM may include a speech model that encodes a speech (audio) input via a set of embeddings and further with tokens that can be used as an input into (and understood by) a language model. In some embodiments, the context is captured by an encoder backbone neural network and then converted, by a suitable S2T modality adapter, to a format accessible to the language model. An input into SALM may include multiple portions that improve performance of the SALM. In one embodiment, a speech prompt prepared by the speech model may be augmented with a context input to take advantage of the in-context learning (ICL) capabilities of the SALM. For example, the context input may include one or more keywords that direct the language model to a corpus of words likely to be present in the speech input, be related to the speech input, and/or likely to be misidentified in the speech input. Such words may include an acronym, a name or some other proper noun, a word that has a homophone word with a similar pronunciation, e.g., "tale" vs. "tail," and/or the like. The ICL enables the SALM to generate correct outputs for new (previously unseen by the SALM) types of speech inputs, e.g., inputs related to a specific industry, field of knowledge, person(s), and/or the like. An additional input into the language model may include an instruction indicative of a specific S2T task to be performed, e.g., "transcribe the input" for ASR, "translate to written Mandarin" for AST, and/or the like. Correspondingly, the output of the SALM can be a textual transcription of the input speech (for ASR), a textual translation of the input speech into a second language (in the instances of AST), and/or some other form of input.

Training of the SALM may deploy in-context training (ICT) techniques. During ICT, the context input into the language model can be partially sampled (e.g., randomly or according to some distribution) from the training speech input and may further be partially sampled from a context database of stored contexts, e.g., stored keywords, other training speech inputs, and/or the like. A single training speech input may then be used to generate a set of training data that includes the same speech input and different sample contexts. The in-context training teaches the SALM to take into account the context portion of the input without always relying on that context, since at least some portion of the context input can be unrelated to the speech input (being sampled from unrelated utterances in the database) or sampled from less representative words of the speech input.

The advantages of the disclosed techniques include but are not limited to increased accuracy of speech processing by a combination of a speech model and a language model. The combination of such models enables on-the-fly selection from multiple S2T processing tasks, such as ASR and ATR, e.g., based on an instruction portion of the input. The context portion of the input enables applying the disclosed systems to speech inputs of the types previously unseen by the systems. This ability of the SALM is further enhanced by the randomized in-context training.

System Architecture

FIG. 1 is a block diagram of an example computer system 100 capable of training and deploying a speech-augmented language model (SALM) for efficient capturing and processing of speech inputs, according to at least one embodiment. As depicted in FIG. 1, computer system 100 may include a speech processing server 102, a data store 150, and a training server 160 connected to a network 140. Network 140 may be a public network (e.g., the Internet), a private network (e.g., a local area network (LAN), or wide area network (WAN)), a wireless network, a personal area network (PAN), a combination thereof, and/or another network type.

Speech processing server 102 may include a desktop computer, a laptop computer, a smartphone, a tablet computer, a server, a wearable device, a VR/AR/MR headset or head-up display, a digital avatar or chatbot kiosk, an in-vehicle infotainment computing device, and/or any suitable computing device capable of performing the techniques described herein. Speech processing server 102 may be configured to receive a speech input 101 that may be associated with any speech episode involving one or more speakers. Speech episodes may include a public or private conversation, a business meeting, a public or private presentation, an artistic event, a debate, an interaction between a digital agent (e.g., chatbot, digital avatar, etc.) and one or more users, an in-vehicle communication (e.g., between two or more occupants, between an occupant(s) and a chatbot, avatar, or digital assistant of the vehicle), and/or the like. Speech input 101 may include a statement, a query, a question, a request for explanation/tutorial, an expression of emotion, a narrative (or a portion of a narrative), a memorandum, a report, and/or any other type of speech that may be produced by a user, including but not limited to a human user. In some embodiments, speech input 101 may include speech generated by a computer, e.g., by a text-to-speech (T2S) model, a chatbot, and/or the like. Speech input 101 may be recorded using one or more devices connected to speech processing server 102 (e.g., a microphone), retrieved from memory 104 of speech processing server 102, and/or received over any local or network connection (e.g., via network 140) from an external computing device. Speech input 101 may be in any suitable format, e.g., WAV, AIFF, MP3, AAC, WMA, or any other compressed or uncompressed audio format. In some embodiments, speech input 101 may be stored (e.g., together with other data, such as metadata) in data store 150. Additionally, data store 150 may store training speech 152 for training one or more models capable of speaker identification, speaker verification, and/or speaker diarization, according to some embodiments disclosed herein. Data store 150 may be accessed by speech processing server 102 directly (e.g., via a bus, interconnect, and/or the like) or (as shown in FIG. 1) via network 140.

Data store 150 may include a persistent storage capable of storing audio files as well as metadata for the stored audio files. Data store 150 may be hosted by one or more storage devices, such as main memory, magnetic or optical storage disks, tapes, or hard drives, network-attached storage (NAS), storage area network (SAN), and so forth. Although depicted as separate from speech processing server 102, in at least some embodiments, data store 150 may be a part of speech processing server 102. In at least some embodiments, data store 150 may be a network-attached file server, while in other embodiments data store 150 may be some other type of persistent storage, such as an object-oriented database, a relational database, and so forth, that may be hosted by speech processing server 102 or one or more different machines coupled to speech processing server 102 via network 140.

Speech processing server 102 may include a memory 104 (e.g., one or more memory devices or units) communicatively coupled to one or more processing devices, such as one or more graphics processing units (GPU) 110, one or more central processing units (CPU) 130, one or more data processing units (DPU), one or more parallel processing units (PPUs), and/or other processing devices (e.g., field-programmable gate arrays (FPGAs), application-specific integrated circuits (ASICs), and/or the like). Memory 104 may include a read-only memory (ROM), a flash memory, a dynamic random-access memory (DRAM), such as synchronous DRAM (SDRAM), a static memory, such as static random-access memory (SRAM), and/or some other memory capable of storing digital data. Memory 104 may store a speech-augmented language model (SALM) 120 implementing various techniques of the instant disclosure. SALM 120 may include one or more components and models supporting various functionalities of SALM 120. In some embodiments, SALM 120 may include a speech model 122 that may be configured and trained to process audio data of speech input 101 and convert the audio data into digital features (embeddings) capturing audio content of speech input 101 and contextual interrelationships between different part of speech input 101. Memory 104 may further include a language model (LM) 124, e.g., a large language model, to process audio embeddings (generated by speech model 122) and any other non-speech input 103 that may be used to form an input into SALM 120. In some embodiments, SALM 120 may deploy one or more speech-to-text (S2T) adapters 126, which may be (or include) a trained neural network (or a portion of a neural network) trained to convert embeddings outputted by speech model 122 and/or embeddings that represent non-speech (e.g., text) input 103 into tokens that can be understood by and processed by LM 124. In some embodiments, non-speech input 103 may provide a context for speech input 101, e.g., one or more keywords, phrases, explanations, etc., that can be used by LM 124 to capture correct meaning of speech input 101 more accurately. In some embodiments, non-speech input 103 may be entered (e.g., typed) by the same user that generated speech input 101.

In some embodiments, non-speech input 103 may be identified automatically by SALM 120 or some other component of speech processing server 102. More specifically, SALM 120 may include (or have access to) stored domain-specific contexts 128 that include various keywords/phrases that may be used to provide contexts to speech inputs 101 associated with a particular domain, e.g., financial products, air travel, computer architecture, gaming applications, and/or the like. In one example embodiment, speech input 101 may undergo initial processing by SALM 120 to identify a specific domain to which speech input 101 relates. SALM 120 may then access stored domain-specific contexts 128 for the identified domain and may use such contexts as non-speech input 103 (together with speech input 101) as part of a second (e.g., final) processing of speech input 101. Domain-specific contexts 128 may be maintained using one or more techniques. For example, at least a portion of domain-specific contexts 128 may be manually selected by one or more human developers of SALM 120. Another portion of domain-specific contexts 128 may include historical contexts (e.g., contexts used in prior user inputs). Yet another portion of domain-specific contexts may be collected from a corpus of texts, e.g., publicly or privately stored collection of texts, whose subject matter is related to a particular domain.

Speech input 101 and non-speech input 103 may be received via any suitable user interface (UI) 106, which may include one or more devices of various modalities. For example, speech input 101 may be received over an audio device, e.g., a microphone, and non-speech input 103 may be received using a keyboard, a touchscreen, a touchpad, a writing pad, a graphical interface, a mouse, a stylus, and/or using any other pointing device capable of selecting words/phrases, e.g., being displayed on a screen, and/or some other suitable device. In some embodiments, speech and non-speech input devices may be separate detachable devices, e.g., a microphone of a digital camera to receive speech input 101 and a computer keyboard to receive non-speech input 103. In some embodiments, speech and non-speech input devices may be integrated together (e.g., into a smartphone, tablet computer, and/or the like).

In at least one embodiment, various models used by SALM 120, e.g., speech model 122, LM 124, S2T adapter 126, and/or other deployed models, may be implemented as deep learning neural networks having multiple levels of linear and non-linear operations. For example, each or some of the deployed models may include convolutional neural networks, recurrent neural networks, fully-connected neural networks, long short-term memory (LSTM) neural networks, neural networks with attention, e.g., transformer neural networks, a combination of a convolutional network and one or more transformers (a conformer), and/or neural networks of other types. In at least one embodiment, any, some, or all deployed models may include multiple neurons, with an individual neuron receiving its input from other neurons and/or from an external source and producing an output by applying an activation function to the sum of weighted (using trainable weights) inputs and, possibly, a bias value. In at least one embodiment, one or more of the deployed models may include multiple neurons arranged in layers, including an input layer, one or more hidden layers, and/or an output layer. Neurons from adjacent layers may be connected by weighted edges. In some embodiments, training server 160 may train a number of different models, which may be models that differ by a number of neurons, number of neuron layers, specific neural architecture, and/or the like.

Training server 160 may use training speech 152 to train one or more models, e.g., to identify parameters (e.g., neural weights, biases, parameters of activation functions, etc.) of the models in the way that maximizes accuracy of various S2T tasks performed by SALM 120, e.g., ASR, AST, and/or the like. Training server 160 may be hosted by a desktop computer, a laptop computer, a smartphone, a tablet computer, a server, and/or any suitable computing device capable of performing the techniques described herein. In some embodiments, training of SALM 120 may be supervised, e.g., using human annotations of training speech 152. Such annotations can include ground truth transcriptions and/or translations of training speech 152, and/or the like. Training speech 152 may be used for supervised training, unsupervised training, semi-supervised training, training that includes reinforcement learning, and/or other types of training. In some embodiments, training engine 162 may implement an in-context training using a context sampler 164 to sample from stored domain-specific contexts (e.g., stored in data store 150), as disclosed in more detail below in conjunction with FIG. 4.

Training speech 152 may be used by training engine 162 as training input 165 to train one or more models used by SALM 120 to recognize and/or translate spoken words in the training speech 152. In some embodiments, training input 165 may further include training contexts 154, e.g., keywords/phrases that may be used to supplement training speech 152. During training of SALM 120, training engine 162 may also generate mapping data 166 (e.g., metadata)

that associates training inputs 165 with correct target outputs 167 (ground truth). During training, training engine 162 may identify patterns in training inputs 165 based on desired target outputs 167 and train SALM 120 to accurately transcribe and/or translate training speech 152.

Training speech 152 may be stored in a data store 150 in a raw audio format, e.g., in the form of spectrograms, or in any other suitable representation characterizing speech. For example, a spectrogram of training speech 152 may be obtained by recording air pressure caused by the speech as a function of time and computing a short-time Fourier transform for overlapping time intervals (frames) of a set duration. This maps the audio signal from the time domain to the frequency domain and generates a spectrogram characterizing the spectral content of training speech 152. The amplitude of the audio signal may be represented on a logarithmic (decibel) scale. In some embodiments, the obtained spectrograms may be further converted into mel-spectrograms, by transforming frequency f into a non-linear mel domain, $f \rightarrow m = a \ln(1+f/b)$, to take into account the ability of a human ear to better distinguish between equally spaced frequencies (tones) at the lower end of the frequencies of the audible spectrum than at its higher end. In one example, a=1607 and b=700 Hz. Throughout this disclosure, the term "speech spectrogram" may be understood to include Fourier spectrograms or mel-spectrograms, where applicable.

Initially, parameters (e.g., edge weights and biases) of various network models being trained may be assigned some starting (e.g., random) values. For various training inputs 165, training engine 162 may cause SALM 120 to generate output(s). Training engine 162 may then compare observed output(s) with the desired target output(s) 167. The resulting error or mismatch, e.g., the difference between the target output(s) 167 and the actual output(s) of the neural networks, may be back-propagated through various neural networks, e.g., speech model 122 and/or S2T adapter 126, and the weights and biases in the neural networks may be adjusted to make the actual (training) outputs closer to the target (ground truth) outputs. This adjustment may be repeated until the output error for a given training input 165 satisfies a predetermined condition (e.g., falls below a predetermined value). Subsequently, a different training input 165 may be selected, a new output generated, and a new series of adjustments implemented, until the respective neural networks are trained to a target degree of accuracy or until the neural network(s) converges to a limit of its accuracy.

In some embodiments, LM 124 may be trained by training engine 162. In some embodiments, LM 124 may be a model that is trained and deployed by an external (relative to speech processing server 102) entity, e.g., language model service 170, which may be a cloud service, a subscription service, and/or some combination thereof. In some embodiments, LM 124 (and/or other deployed language models) may be or include a large language model (LLM). LM 124 may be trained to capture syntax and semantics of human language, e.g., by predicting a next, a previous, and/or a missing word in a sequence of words (e.g., one or more sentences of a human speech or text). LM 124 may be further trained using training data containing a large number of texts, such as human dialogues, newspaper texts, magazine texts, book texts, web-based texts, and/or any other texts. Trained LM 124 may be capable of carrying out a (textual) conversation with a user (a human user or a computer) in natural language in a manner that closely resembles a dialogue with a human speaker, including understanding the user's intent and responding in ways that the user expects from a conversational partner. LM 124 may be implemented using neural networks with a large number (e.g., billions) of artificial neurons, including but not limited to deep learning neural networks equipped with a self-attention mechanism (such as transformer neural networks).

Predictive utility of the patterns identified by SALM 120 during training may be subsequently verified (validated or tested) using additional training input/target output associations. The trained SALM 120 may then be used, during the inference stage, for processing of new (not previously encountered) speech inputs 101.

In at least one embodiment, training server 160 and speech processing server 102 may be implemented on a single computing device. Training server 160 and/or speech processing server 102 may be (and/or include) a rackmount server, a router computer, a personal computer, a laptop computer, a tablet computer, a desktop computer, a media center, or any combination thereof.

Figure 2:
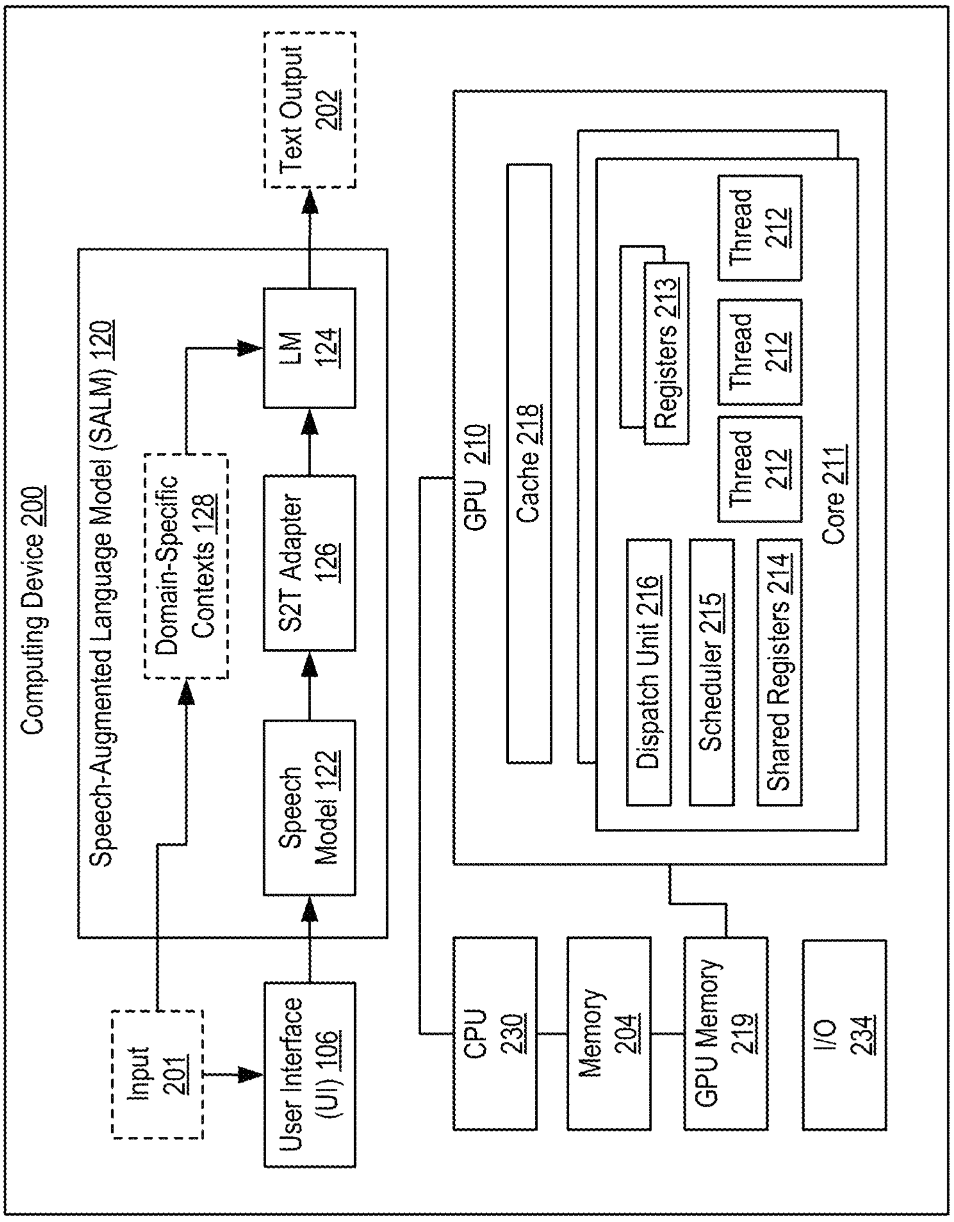
FIG. 2 illustrates an example computing device that supports training or deployment of a speech-augmented language model, according to at least one embodiment.

FIG. 2 illustrates an example computing device 200 that supports training or deployment of a speech-augmented language model 120, according to at least one embodiment. In at least one embodiment, computing device 200 may be a part of speech processing server 102. In at least one embodiment, computing device 200 may be a part of training server 160. In at least one embodiment, computing device 200 supports SALM 120 that includes (but need not be limited to) speech model 122, speech-to-text adapter 126, and language model 124. SALM 120 may be capable of processing an input 201 and generating accurate text output 202. Input 201 may include a speech input (e.g., speech input 101) received over any audio device (e.g., a microphone) in real time or previously recorded audio input that includes speech. The audio device may be a part of a UI 106 that may further include non-audio devices, e.g., a keyboard, a touchscreen, a writing pad, and/or the like, to receive a non-speech portion of input 201. The non-speech portion may include context associated with the speech input, e.g., one or more typed (or otherwise selected) keywords, phrases, acronyms, etc., and one or more instructions indicating to SALM what type of text output 202 is expected. For example, instructions to perform same-language transcription of the input speech may result in an ASR text output while instructions to perform translation of the input speech into a different language may result in an AST text output. In some embodiments, the non-speech portion of input 201 may be obtained by identifying keywords/phrases stored as part of domain-specific contexts 128 identified based on the speech portion of input 201.

Operations of SALM 120 may be executed using one or more GPUs 210, one or more CPUs 230, one or more parallel processing units (PPUs) or accelerators, such as a deep learning accelerator, data processing units (DPUs), and/or the like. In at least one embodiment, a GPU 210 includes multiple cores 211, each core being capable of executing multiple threads 212. Each core may run multiple threads 212 concurrently (e.g., in parallel). In at least one embodiment, threads 212 may have access to registers 213. Registers 213 may be thread-specific registers with access to a register restricted to a respective thread. Additionally, shared registers 214 may be accessed by one or more (e.g., all) threads of the core. In at least one embodiment, each core 211 may include a scheduler 215 to distribute computational tasks and processes among different threads 212 of core 211. A dispatch unit 216 may implement scheduled tasks on appropriate threads using correct private registers 213 and shared registers 214. Computing device 200 may include input/output component(s) 234 to facilitate exchange of information with one or more users or developers.

In at least one embodiment, GPU 210 may have a (high-speed) cache 218, access to which may be shared by multiple cores 211. Furthermore, computing device 200 may include a GPU memory 219 where GPU 210 may store intermediate and/or final results (outputs) of various computations performed by GPU 210. After completion of a particular task, GPU 210 (or CPU 230) may move the output to (main) memory 204. In at least one embodiment, CPU 230 may execute processes that involve serial computational tasks whereas GPU 210 may execute tasks (such as multiplication of inputs of a neural node by weights and adding biases) that are amenable to parallel processing. In at least one embodiment, SALM 120 may determine which processes are to be executed on GPU 210 and which processes are to be executed on CPU 230. In other embodiments, CPU 230 may determine which processes are to be executed on GPU 210 and which processes are to be executed on CPU 230.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, generative AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems for generating or presenting at least one of augmented reality content, virtual reality content, mixed reality content, systems incorporating one or more virtual machines (VMs), systems for performing synthetic data generation operations, systems implemented at least partially in a data center, systems for performing generative AI operations, systems for performing conversational AI operations, systems for performing light transport simulation, systems for performing collaborative content creation for 3D assets, systems implementing one or more language models, such as large language models (LLMs) (which may process text, voice, image, and/or other data types to generate outputs in one or more formats), systems implemented at least partially using cloud computing resources, and/or other types of systems.

Multi-Speaker Speech Recognition System

Figure 3:
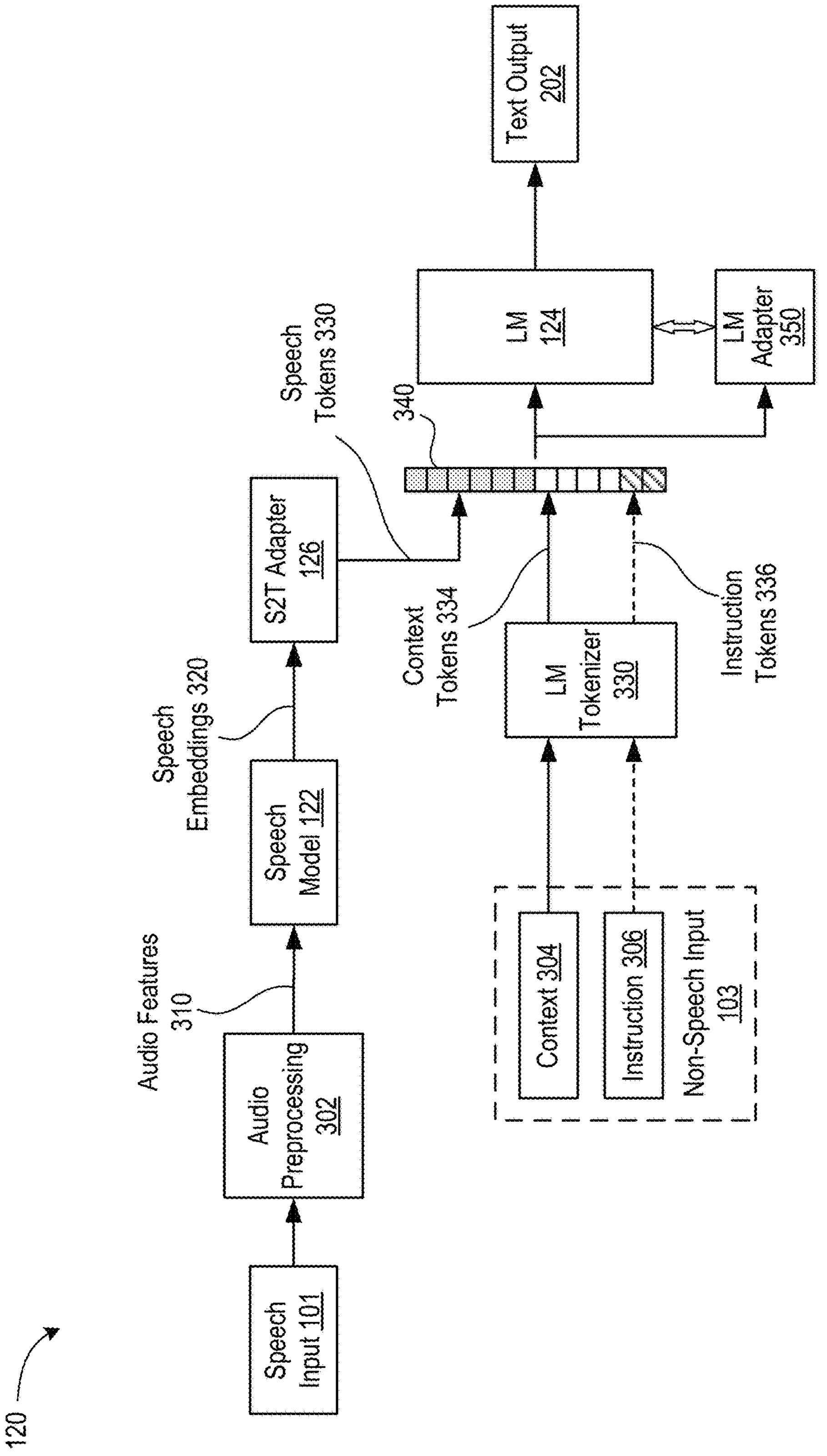
FIG. 3 illustrates an architecture and data flow of an example speech-augmented language model capable of efficient processing of speech inputs, according to at least one embodiment.

FIG. 3 illustrates an architecture and data flow of an example speech-augmented language model 120 capable of efficient processing of speech inputs, according to at least one embodiment. In at least one embodiment, SALM 120 may be supported by speech processing server 102, which may be located on a single computing device or distributed across multiple computing devices. Various blocks denoted in FIG. 3 with the same numerals as the respective blocks of FIG. 1 and/or FIG. 2 may implement the same (or a similar) functionality.

As illustrated in FIG. 3, SALM 120 may receive speech input 101 captured by one or more audio sensors, e.g., microphones. Microphones can include dynamic microphones, condenser microphones, ribbon microphones, unidirectional microphones, omnidirectional microphones, and/or any other types of microphones. In some embodiments, a microphone can be combined with other devices, e.g., computers, phones, speakers, TV screens, and/or the like. The speech input 101 collected by the audio sensors may be generated, e.g., spoken, by any number of speakers and may include a single speech episode or multiple speech episodes. The audio sensors may capture not only a speech signal but also background noise, interference signals, e.g., emitted by TV devices, radio devices, alarm devices, and/or any other equipment, or sounds naturally occurring (e.g., sound of wind, water, birds, etc.).

Speech input 101 may undergo audio preprocessing 302. For example, audio preprocessing 302 may include filtering, denoising, amplification, dereverberation, segmentation, and/or any other suitable audio signal enhancement. Audio preprocessing 302 may further include removal of portions of the speech input 101 that do not have a speech content. For example, preprocessing 302 may evaluate energy e(t) associated with the audio data as a function of time and identify regions that have energy less than a certain threshold (e.g., an empirically determined noise threshold). Such identified regions may be removed (trimmed) from speech input 101 during audio preprocessing 302. Segmentation may include segmenting speech input 101 into intervals of a predetermined size (duration), t, e.g., 0.05-5 sec. Such intervals need not correspond to a complete logical unit of speech and may encompass one or more sentences, one or more words, a part of a word, one or more exclamations, filler words, pauses, and/or the like. In some embodiments, the intervals may be partially overlapping.

Individual intervals may be represented via one or more frames, e.g., T frames over a certain predetermined interval of time. Frames may have a duration of 15 msec, 20 msec, 30 msec, and/or some other duration. Frames may undergo a suitable frame-to-spectrogram transformation. For example, a spectrogram of a frame may be obtained or generated by performing discrete Fourier transforms of acoustic energy e(t) or air pressure p(t) associated with a specific utterance. The obtained spectrograms $e(f_j)$ may be defined for a number of bands $f_1, f_2 \ldots f_C$, for example, for C=80 bands or C=128 bands, or any other number of bands. In some embodiments, the bands may be mel-bands and the spectrograms may be mel-spectrograms. Separate spectrograms may be obtained for separate audio frames.

Audio preprocessing 302 may further convert the spectrograms into audio features 310, also referred to as embeddings herein. Embeddings can be formed using a wav2vec converter or any other suitable audio-to-embeddings converter. An embedding (audio feature) should be understood as any suitable digital representation of speech input 101, e.g., as a vector (string) of any number D of components, which can have integer values or floating-point values. Embeddings can be considered as vectors or points in a D-dimensional embedding space. The dimensionality D of the embedding space can be smaller than the size of the speech input 101 (or corresponding spectrograms or frames representing speech input 101. Audio features 310 can be generated using a suitable embeddings model that is trained to associate similar sets of training audio spectrograms/ frames with similar embeddings represented by points closely situated in the embedding space and further learns to associate dissimilar sets of training audio spectrograms/frames with points that are located further apart in the embedding space. In some embodiments, a separate embedding (or a separate set of embeddings) can represent a respective audio frame or a predetermined number of audio frames. A given audio feature (embedding) can encode one or more words, or a portion of a word (e.g., one or more syllables of a word).

Audio feature 310 may be processed by speech model 122 that serves as an encoder of audio features 310 to capture temporal and frequency correlations to efficiently encode a context of speech input 101. In one embodiment, speech model 122 may be of a conformer type. The conformer architecture combines elements of transformer networks, e.g., self-attention layers, with elements of convolutional networks, e.g., layers of kernels (filters) that narrow or broaden a field of perception. For example, a conformer network may include a stack of alternating multi-head attention layers, depth-wise separable convolutional layers, and/or fully-connected layers. Some of the layers of a conformer network may be connected with residual (skipped) connections. In some embodiments, a conformer network may include a downsampling module, which may be deployed at the start of the conformer, to modify a frame rate of audio features 310. In some embodiments, a Fast Conformer may be deployed. A Fast Conformer may differ from a conventional conformer in the use of a larger-scale initial downsampling (e.g., 8× downsampling) to reduce computational costs of subsequent attention layers, replace some of the sub-sampling convolutional layers with depth-wise separable convolutions, reduce a number of convolutional filters in downsampling block(s) (e.g., to 256), and further reduce a size of convolutional kernel(s), (e.g., to 9). In some embodiments, speech model 122 may include a NeMo-type model having 100 or more million learnable parameters.

Speech model 122 generates speech embeddings 320 that encode speech input 101 and are to be used in subsequent processing by LM 124. In some embodiments, LM 124 may be a large language model, e.g., a GPT-type Megatron model, which may include one or more billion of learned parameters and may be pre-trained using self-supervised training techniques and supervised fine-tuning training techniques. Since speech embeddings 320 may be in a format different from a format understood by LM 124, SALM 120 may deploy an S2T adapter 126 to convert speech embeddings 320 to speech tokens 330 that can be processed by LM 124. For example, LM 124 may operate in conjunction with a known set of tokens, which may include any suitable representation of units of speech (e.g., syllables, words, etc.) as numbers. In one example of GPT-4 tokens, word “the” may be represented via token “280”, word “import” may be represented via token “476,” word “description” may be represented via token “4097,” and so on. In other embodiments, individual words may be represented using any number of tokens, or word transitions (e.g., end of one word, beginning of next) may be represented using a single token. As such, tokenizing may be performed in any manner that is suitable for input to the network.

In one embodiment, S2T adapter 126 may include one or more conformer layers with subsampling (e.g., downsampling). In addition to converting outputs of speech model 122 to speech tokens 330, S2T adapter 126 may also function as a converter that matches a different information rate of speech and text communication.

Input into SALM 120 may include context 304 and instruction 306 that augment speech input 101. In some embodiments, any or both of the context 304 and/or instruction 306 may be parts of non-speech input 103 (e.g., a typed input provided by the user). Context 304 may include one or more keywords, phrases, acronyms, punctuation marks, and/or any relevant speech units that direct LM 124 model to a corpus of words likely to be associated with speech input 101, be related to speech input 101 (e.g., identifying a general field to which speech input 101 belongs), directly present in speech input 101, and/or likely to be misidentified in speech input 101 (as homophones of other words). For example, speech input 101 may include a sentence:

Speech Input: “Thousands of NVIDIA employees and our partners worked incredibly hard to pull GTC together for you.”

Context 304 may specify related terms:

Context: “Following words may occur in speech: NVIDIA, GPU Technology Conference (GTC), GPU . . . ”

The presence of such context keywords in the input processed by LM 124 reduces the likelihood that LM 124 will misidentify “NVIDIA” as “a video,” misidentify “GTC” as “jet ski,” and/or the like.

Instruction 306 may indicate a specific S2T task to be performed. For example, in the instance of ASR, instruction 306 may include:

Instruction: “Provide English transcription [of speech input].”

Similarly, in the instances of AST, instruction 306 may include:

Instruction: “Provide Spanish translation [of speech input].”

LM tokenizer 330 may convert context 304 into context tokens 334 and may similarly convert instruction 306 into instruction tokens 336. Context tokens 334 and instruction tokens 336 may then be combined, e.g., concatenated or otherwise aggregated with speech tokens 330 into a combined input 340. LM 124 processes the combined input 340 to generate text output 202, e.g., as directed by instruction 306.

In some embodiments, LM 124 may be a frozen model, e.g., a model whose parameters are fixed at pre-training (e.g., pre-training performed by language model service 170 of FIG. 1) and not changed during training of SALM 120 (e.g., as disclosed in more detail in conjunction with FIG. 4 below). In such embodiments, to facilitate learning and performing multiple S2T tasks, SALM 120 may include a trained LM adapter 350. LM adapter 350 may be a lightweight model having a smaller (in some embodiments, much smaller) number of trainable parameters, compared with LM 124. The smaller number of parameters of LM adapter 350 makes training of SALM 120 significantly faster and less expensive, e.g., requiring less training data and fewer training epochs.

In some embodiments, LM adapter 350 may have a low-rank architecture. More specifically, operations of a given linear layer of LM 124 may amount to a (frozen) h×d matrix of weights $W_{h\times d}$. LM adapter 350 (for the same layer) may include multiple, e.g., two, matrices $A_{h\times r}$ (of dimension h×r) and $B_{r\times d}$ (of dimension r×d), where the dimension r is much smaller than h or d (or both, r<<h, d). Learned (during supervised training) elements of matrices $A_{n\times r}$ and $B_{r\times d}$ may be used during inference to augments weights $W_{h\times d}$ of LM 124, e.g., according to:

$$W_{h\times d} \rightarrow W_{h\times d} + A_{h\times r} \cdot B_{r\times d}.$$

Correspondingly, an input into the layer of LM 124 is processed by two parallel branches, e.g., frozen weights $W_{h\times d}$ of LM 124 and low-rank matrix product $A_{h\times r} \cdot B_{r\times d}$ of LM adapter 350. Similar augmentation may be performed for other layers of LM 124.

Text output 202 of LM 124 (augmented with LM adapter 350) may include correct transcription and/or translation of speech input 101. For example, in the instance of an ASR instruction 306, text output 202 may be:

Text Output: "Thousands of NVIDIA employees and our partners worked incredibly hard to pull GTC together for you."

In the instance of the AST instruction 306, text output 202 may be:

Text Output: "Miles de empleados de NVIDIA y nuestros socios trabajaron increíblemente duro para crear GTC para usted."

Figure 4:
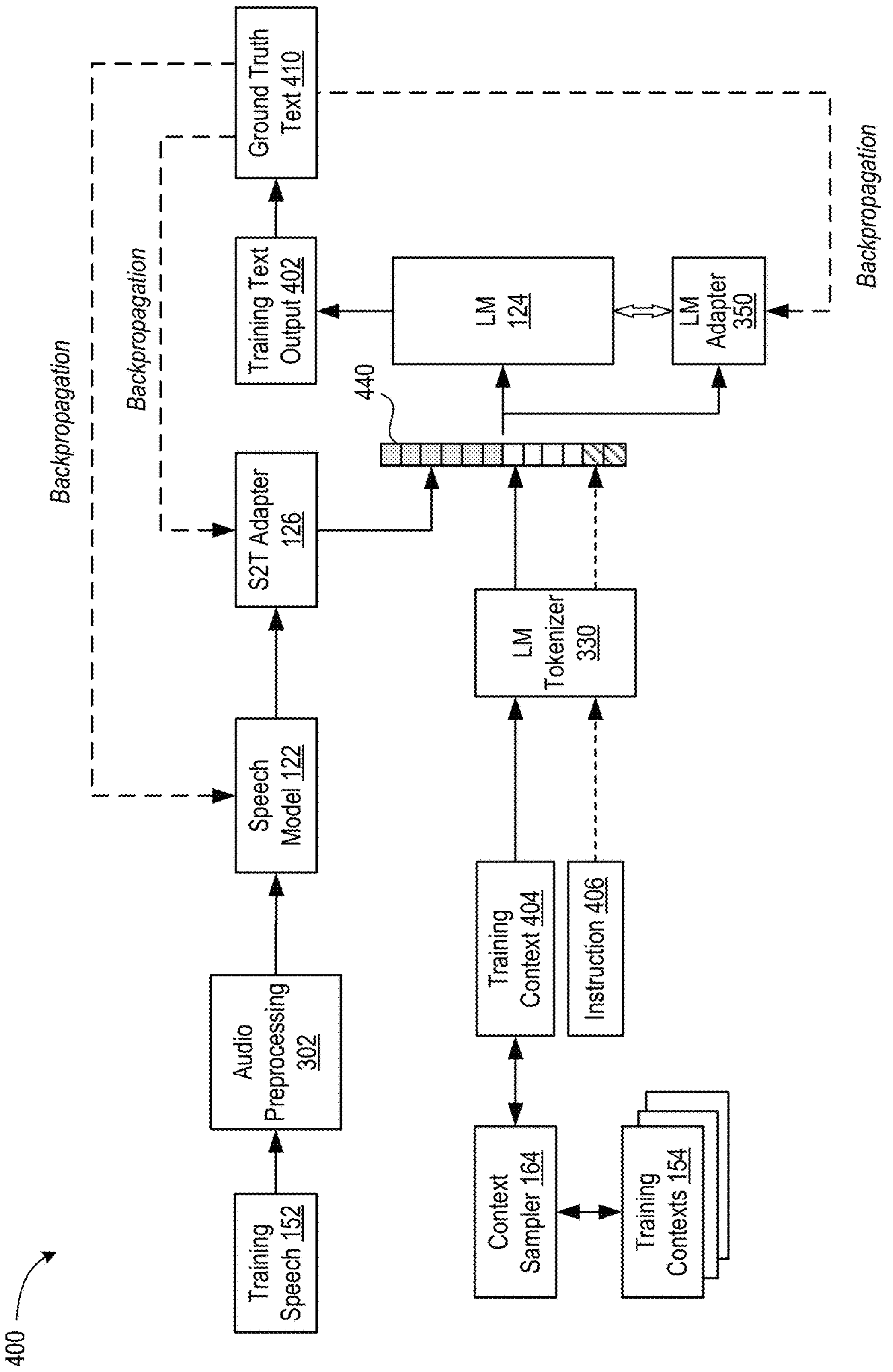
FIG. 4 illustrates example training of the speech-augmented language model capable of efficient speech-to-text processing, according to at least one embodiment.

FIG. 4 illustrates example training 400 of the speech-augmented language model 120 capable of efficient speech-to-text processing, according to at least one embodiment. The model, whose training is illustrated in FIG. 4, may be SALM 120 of FIG. 3. In at least one embodiment, training of SALM 120 may be performed by training engine 162 of training server 160 and subsequently uploaded to speech processing server 102. Various blocks denoted in FIG. 4 with the same numerals as the respective blocks of FIG. 3 may implement the same (or a similar) functionality.

Training speech 152 may be captured by one or more audio sensors, undergo audio preprocessing 302, processing by speech model 122 and S2T adapter 126. Training context 404 and instruction 406 may be processed by LM tokenizer 330 and the resulting tokens may be combined with tokens representing training speech 152 (and output by S2T adapter 126) into combined input 440. Combined input 440 is then processed by LM 124 and LM adapter 350 that together generate a training text output 402. Training text output 402 may then be compared with a ground truth text 410 associated with training speech 152. For example, in the instances of training ASR speech, ground truth text 410 may include a transcription of training speech 152 in the original language. In the instances of training AST speech, ground truth text 410 may include a translation of training speech 152 into a second language. The difference (mismatch) between training text output 402 and ground truth text 410 may be used to modify parameters of various networks of SALM 120, e.g., speech model 122, S2T adapter 126, and/or LM adapter 350, e.g., using various techniques of back-propagation, gradient descent, and/or other training techniques.

During training of the SALM, diverse training inputs that include training speech 152 and training contexts 404 may be used with instructions 406 corresponding to various S2T speech tasks, e.g., ASR, AST, and/or the like. This promotes accurate instruction-following while also effectively training S2T adapter 126 and LM adapter 350 to perform various speech tasks successfully. In some embodiments, training speech 152 and training contexts 404 for ASR and AST training may be obtained from publicly available audio/texts pairs with randomly prepended instructions, e.g., as illustrated with the examples provided above in conjunction with FIG. 3.

In-context training (ICT) techniques may include probabilistically, e.g., randomly (or according to a suitable distribution), sampling various stored training contexts 154 with context sampler 164. As a result, sampled training context 404 may include both the keywords (or other types of context) of training speech 152 (e.g., known as part of ground truth text 410) and randomly sampled keywords. For example, training speech 152 may include:

Training speech: "Some of the popular ETFs, including Reguard's S-and-P five hundred, underperformed over the last month compared with fixed-income securities."

Context 404 provided with this training speech may specify:

Context: "Following words may occur in speech: unemployment, Exchange-Traded Fund (ETF), diplomacy, S&P 500, Reguard, bond market . . . "

This context may include keywords that are actually present in the training speech, e.g., "ETF, S&P 500, Reguard," keywords that refer to the general field to which the training speech relates, e.g., "bond market," and keywords that are randomly sampled from a broader corpus of training contexts 154, e.g., "unemployment" and "diplomacy."

Ground truth text 410 may include a correct transcription (or translation) of the training speech and may include "ETF, S&P 500, Reguard," but not include "bond market, unemployment, and diplomacy." Training text outputs 402 that erroneously include one of the latter keywords may inform the training engine how various parameters of trainable parts of the SALM (e.g., speech model 122, S2T adapter 126, and/or LM adapter 350) are to be modified for the training truth text 410 to more accurately (or fully) match ground truth text 410. Such in-context training teaches the SALM to consider the context portion of the input without unduly relying on that context. A single training speech 152 may then be used to generate multiple sets (speech-context) pairs of training data that includes the same speech input and different contexts.

Prior to the start of training, speech model 122 may be initialized using a suitable set of parameters, e.g., one or more NVIDIA NGC® (NVIDIA GPU Cloud) checkpoints, such as ASR checkpoints, or conformer self-supervised learning (SSL) checkpoints. In some embodiments, S2T adapter 126 may be randomly initialized, e.g., with various parameters sampled from a normal (Gaussian) distribution.

LM 124 may be a large language model with billions of parameters and may be pretrained (using self-supervised training) on a set of tokens, using web-crawl data, news, conversations, books, scientific texts, and/or the like. LM 124 may be trained using English and non-English texts. Subsequently, LM 124 may be fine-tuned using any suitable public instruction datasets. During training 400, parameters of LM 124 may remain fixed.

In some example embodiments, the SALM may be trained with 64 global batch size, using Adam Optimizer with learning rate 10-4 and weight decay of 10-4. In some embodiments, Cosine annealing with 2000 warm-up steps may be used. Gradients may be clipped to 5.0 maximum. Multiple, e.g., 2, 4, 8, or more GPUs may be used for various training tasks.

For ASR tasks, the SALM may be trained using LibriSpeech training set, which is a corpus of about 1000 hours of read English speech with sampling rate of 16 kHz. A suitable checkpoint may be selected based on a word error rate.

For AST tasks, the SALM may be trained using English audio data paired with translations to one or more other languages. In one example embodiment, audio data for the Offline Track of IWSLT (International Conference on Spoken Language Translation) may be used, being paired with pseudo-generated translations to German and Japanese. In one example embodiment, a training dataset that includes 2.7M segments corresponding to 4.8K hours of audio was used. In one example embodiment, the trained model evaluation may be performed using a suitable multilingual speech translation corpus, e.g., MuST-C v2 tst-COMMON or a similar corpus. In one example embodiment, speech model 122 may include a 17-layer conformer encoder followed by a 6-layer transformer decoder, but other model architectures are also within the scope of the instant disclosure. In one example embodiment, for learning a vocabulary in a target language, 16384k Byte-Pair Encodings (BPEs) trained on texts were used.

For evaluating in-context learning (context-enhanced S2T processing), a suitably selected test dataset may be used, e.g., a set of data obtained from NVIDIA GTC talks, in one example non-limiting embodiment. In one example embodiment, the test dataset is forced-aligned and segmented, with 8 hours (or more) of audio recordings. The test dataset may include a large number of different acronyms, product names, technical terms, and/or the like, which often have low recognition accuracy for ASR systems. In one example embodiment, the keyword list may be built with words and phrases of high-frequency occurrences and low recognition accuracy may be selected. Evaluation of keywords recognition accuracy may be performed using precision P, recall R, F-score F=2PR/(P+R), e.g., as calculated from keywords according to alignment of the ASR results with ground truth. In one example embodiment, a baseline transducer model may use a shallow-fusion approach for the boosting. During beam search decoding, partial hypotheses may be rescored according to a suitable context biasing graph. In one example embodiment, the context biasing graph was taken from the Icefall toolkit with context score 4 and a modified adaptive expansion search with beam width=5, $\alpha$=2, and $\gamma$=8.

Figure 6:
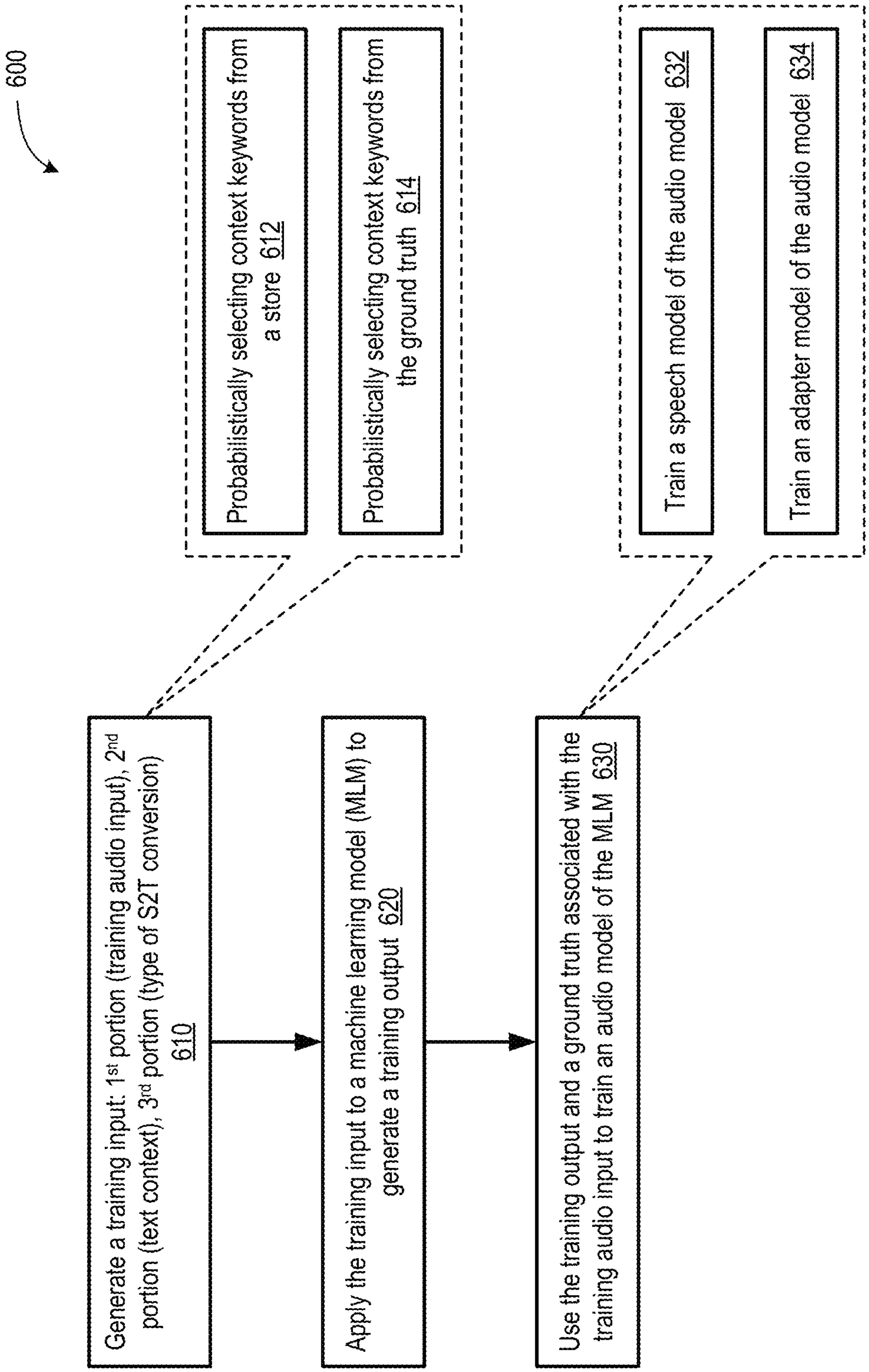
FIG. 6 is a flow diagram of an example method of training a speech-augmented language model for efficient capturing and processing of speech inputs, according to at least one embodiment.

FIG. 5 and FIG. 6 are flow diagrams of respective methods 500 and 600 that facilitate training and deployment of a speech-augmented language model for efficient capturing and processing of speech inputs, according to at least one embodiment. Methods 500 and 600 may be performed using one or more processing units (e.g., CPUs, GPUs, accelerators, PPUs, DPUs, etc.), which may include (or communicate with) one or more memory devices. In at least one embodiment, methods 500 and 600 may be performed using processing units of speech processing server 102 or training server 160 of FIG. 1 and FIG. 2. In at least one embodiment, processing units performing any of methods 500 and 600 may be executing instructions stored on a non-transient computer-readable storage media. In at least one embodiment, any of methods 500 and 600 may be performed using multiple processing threads (e.g., CPU threads and/or GPU threads), with individual threads executing one or more individual functions, routines, subroutines, or operations of the methods. In at least one embodiment, processing threads implementing any of methods 500 and 600 may be synchronized (e.g., using semaphores, critical sections, and/or other thread synchronization mechanisms). Alternatively, processing threads implementing any of methods 500 and 600 may be executed asynchronously with respect to each other. Various operations of any of methods 500 and/or 600 may be performed in a different order compared with the order shown in FIG. 5, and FIG. 6. Some operations of any of methods 500 and 600 may be performed concurrently with other operations. In at least one embodiment, one or more operations shown in FIG. 5 and FIG. 6 may not always be performed.

Methods 500 and 600 may be performed in the context of speech-to-text processing, e.g., ASR, AST, and/or the like. Methods 500 and 600 may involve speech utterances produced by people in any possible context, e.g., a conversation, a public speech, a public event, a business meeting, a conference, a street encounter, an interaction in a game, an interaction with a chatbot or digital avatar, an interaction with an in-vehicle infotainment system, and/or the like. "Speech," as used in the context of methods 500 and 600 should be understood as including sounds produced by humans as well as robotic speech, e.g., a synthesized or computer-generated speech, and/or the like.

FIG. 5 is a flow diagram of an example method 500 of deploying a speech-augmented language model for efficient capturing and processing of speech inputs, according to at least one embodiment. One or more operations of method 500 may be performed by speech processing server 102 of FIG. 1 and FIG. 2.

At block 510, one or more processing units executing method 500 may process, using a speech model (e.g., speech model 122 of FIG. 3), an audio input (e.g., speech input 101) in a first language to generate a first portion of an input (e.g., speech tokens 330) into a language model (e.g., LM 124). In some embodiments, as illustrated with the callout block 512 in FIG. 5, processing the audio input to generate the first portion of the input into the LM may include converting, using an adapter neural network (e.g., S2T adapter 126), an output of the speech model into one or more tokens of a format associated with the LM (e.g., converting speech embeddings 320 outputted by speech model 122 into speech tokens 330). In some implementations, the speech model may include a neural network having a conformer architecture, e.g., an architecture that includes a combination of convolutional neuron layers and transformer neuron layers.

At block 520, method 500 may include providing, to the LM, the input into the LM (e.g., combined input 340). The input may include the first portion and a second portion. The second portion (e.g., context tokens 334) may represent a text context (e.g., context 304) associated with the audio input. In some implementations, the text context may include one or more keywords associated with the audio input. In some implementations, the text context may be received from a speaker that generated the audio input. In some implementations, the input into the LM may further include a third portion (e.g., instruction tokens 336) identifying a type of the speech-to-text conversion to be performed by the LM, e.g., ASR, AST, and/or the like. In some implementations, the first portion, the second portion, and the third portion are provided to (and processed by the LM) concurrently.

In some implementations, identification of the text context may be performed as indicated in the bottom callout portion of FIG. 5. More specifically, at block 522, method 500 may include identifying a subject area associated with the audio input. At block 524, method 500 may include assembling the text context from one or more entries that are stored in association with the identified subject area. In some implementations, identifying the subject area associated with the audio input may include receiving a preliminary output of the LM. The preliminary output may be generated in response to a preliminary input generated (e.g., by the LM) using the audio input, e.g., by asking the LM to identify a subject area associated with the audio input.

At block 530, method 500 may continue with receiving, from the LM, an output that includes a speech-to-text conversion of the audio input. The speech-to-text conversion may include a transcription of the audio input in the first language, and/or a translation of the audio input into a second language. At block 540, method 500 may include providing the output to a user, which may be the same or different from the speaker that generated the audio input.

FIG. 6 is a flow diagram of an example method 600 of training a speech-augmented language model for efficient capturing and processing of speech inputs, according to at least one embodiment. One or more operations of method 600 may be performed by training server 160 of FIG. 1. At block 610, one or more processing units executing method 600 may generate a training input (e.g., combined input 440 in FIG. 4). The training input may include a first portion (e.g., training speech 152 in FIG. 4) that includes a training audio input in a first language. The training input may further include a second portion (e.g., training context 404) that includes a text context associated with the training audio input. The training input may further include a third portion (e.g., instruction 406) identifying a type of a speech-to-text conversion of the training audio input to be generated by a machine learning model (MLM). In some implementations, the speech-to-text conversion may include a transcription of the audio input in the first language and/or a translation of the audio input into a second language.

In some implementations, the MLM may include an audio model that processes the first portion and generates an intermediate output, and a language model (e.g., LM 124) that processes the intermediate output, the second portion, and the third portion. The audio model may include a speech neural network (e.g., speech model 122) and an adapter neural network (e.g., S2T adapter 126). The adapter neural network may convert an output of the speech neural network (e.g., speech embeddings 320 in FIG. 3) to the intermediate output.

In some implementations, the text context may include one or more keywords associated with the training audio input. As indicated with the top callout portion of FIG. 6, preparing the text context may include probabilistically selecting (at block 612) a first subset of the one or more keywords from a store of training inputs. Preparing the text context may also include probabilistically selecting (at block 614) a second subset of the one or more keywords from a ground truth text associated with the training audio input.

At block 620, method 600 may include applying the training input to the MLM to generate a training output (e.g., training text output 402). The training output may include the speech-to-text conversion of the training audio input.

At block 630, method 600 may continue with using the training output and a ground truth associated with the training audio input to train the audio model. Training the audio model may include training the speech neural network (callout block 632), training the adapter neural network (callout block 634), or training both neural networks, but may also include training additional neural networks, e.g., LM adapter 350.

The systems and methods described herein may be used for a variety of purposes, by way of example and without limitation, for performing one or more operations with respect to machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., an in-vehicle infotainment system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

Inference and Training Logic

Figure 7A:
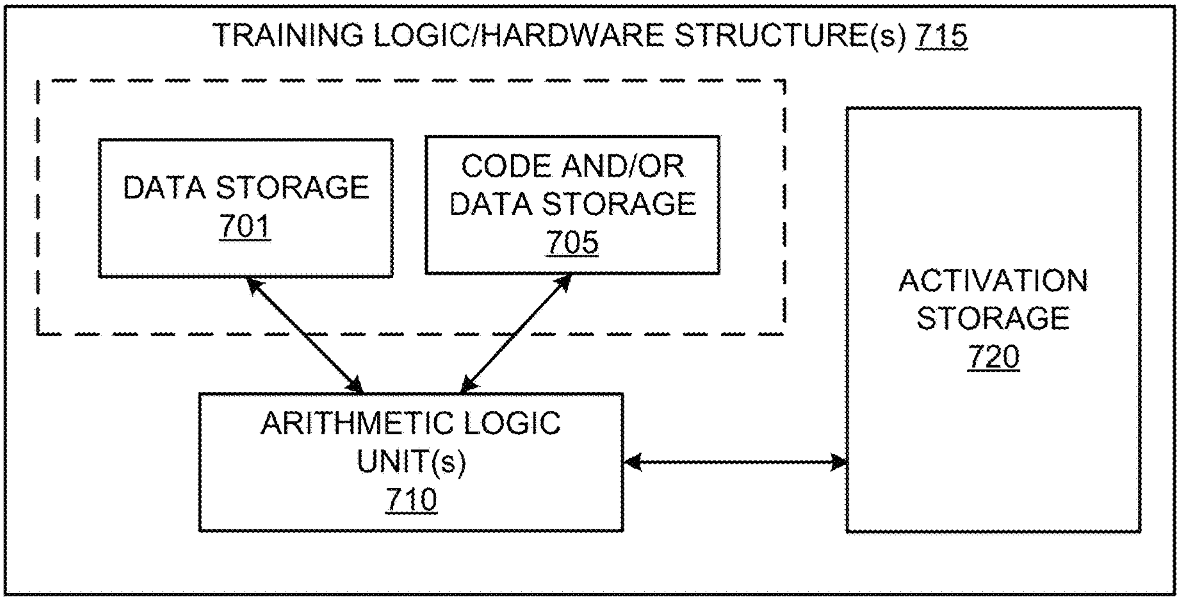
FIG. 7A illustrates inference and/or training logic, according to at least one embodiment.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
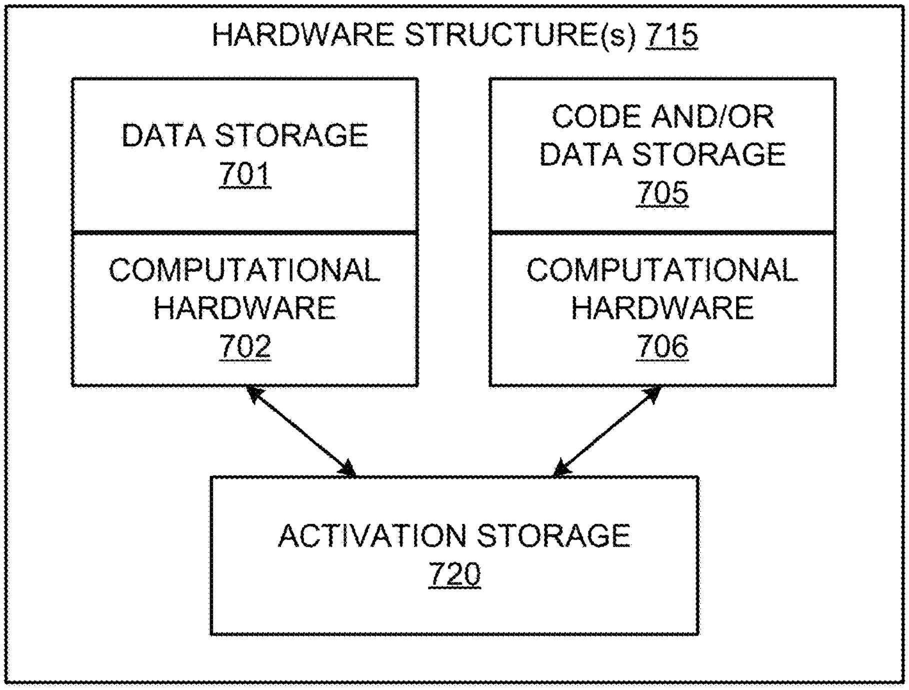
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
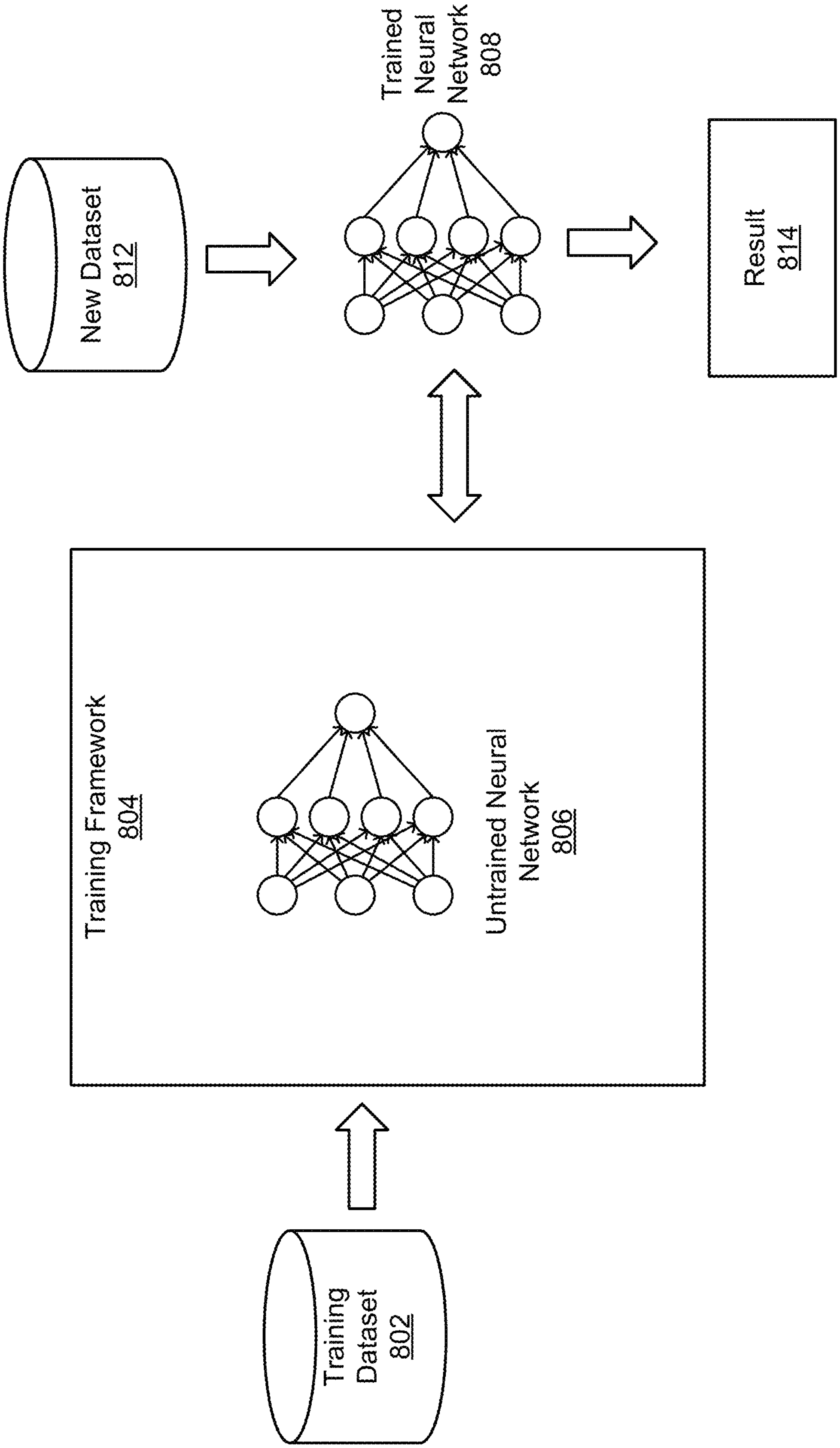
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a TensorFlow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjusting weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, whereas untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map in trained neural network 808 capable of performing operations useful in reducing dimensionality of new dataset 812. In at least one embodiment, unsupervised training can also be used to perform anomaly detection, which allows identification of data points in new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
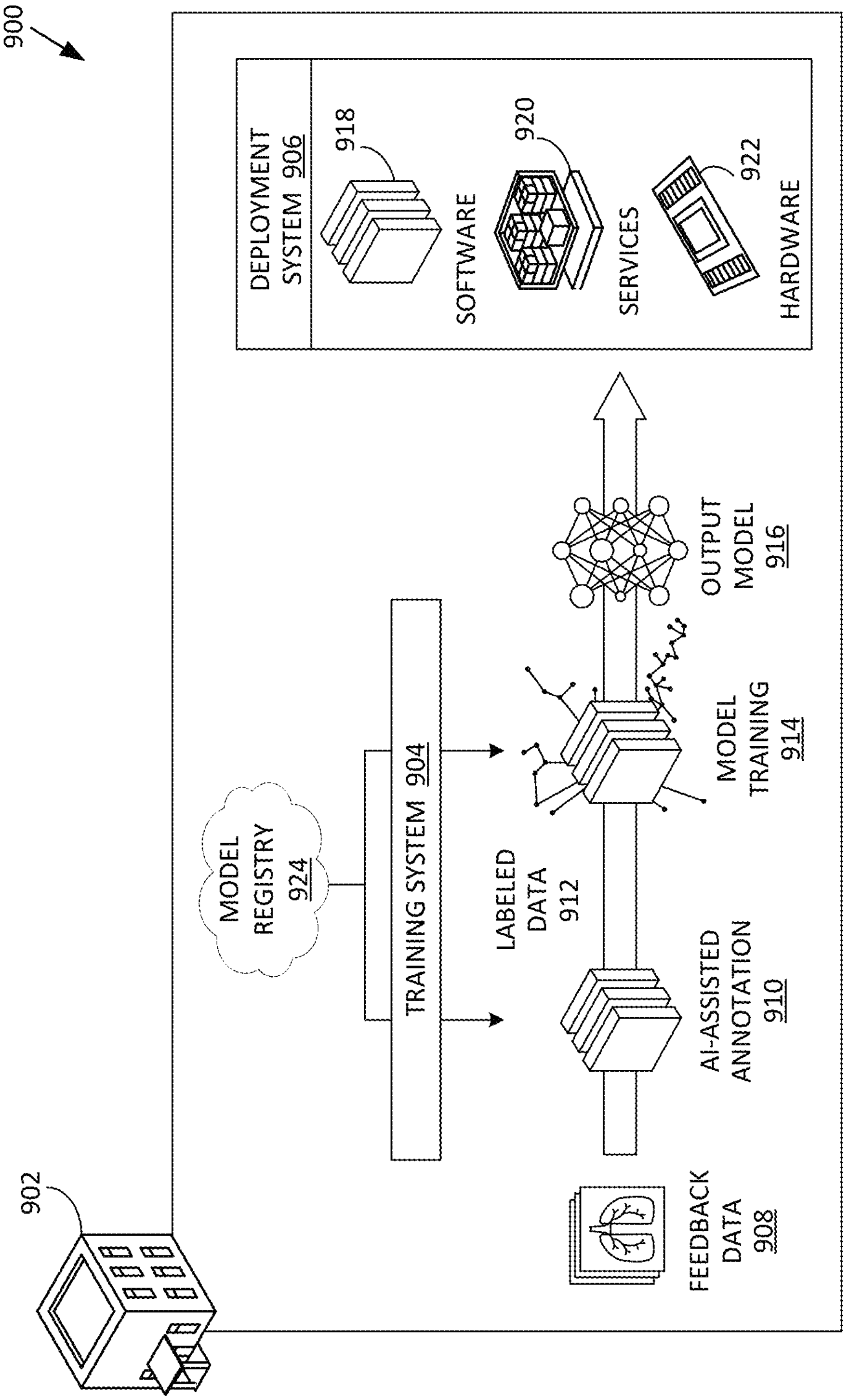
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some applications used in advanced processing and inferencing pipelines may use machine learning models or other AI to perform one or more processing steps. In at least one embodiment, machine learning models may be trained at facility 902 using feedback data 908 (such as imaging data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may be uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model, or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model, e.g., via model training 914 in FIGS. 9-10. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities that are remotely located). In at least one embodiment, machine learning models may have been trained on imaging data from one location, two locations, or any number of locations. In at least one embodiment, when being trained on imaging data, which may be a form of feedback data 908, from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914—e.g., AI-assisted annotations 910, labeled data 912, or a combination thereof—may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo preprocessing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in one or more container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, once validated by system 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
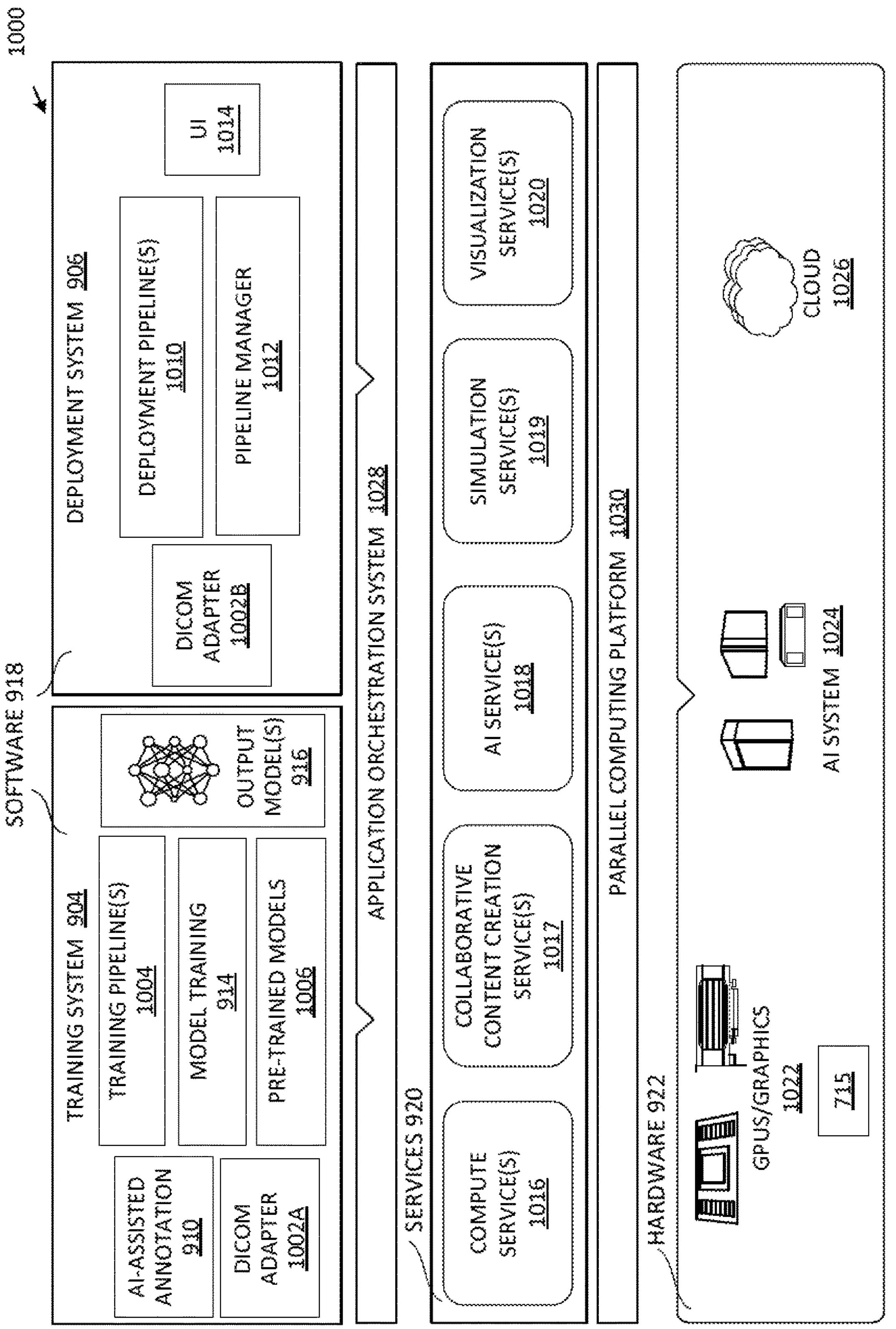
FIG. 10 is a system diagram for an example system for training, adapting, instantiating and deploying machine learning models in an advanced computing pipeline, according to at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity that provides an inference or image processing request may browse a container registry and/or model registry 924 for an application, container, dataset, machine learning model, etc., select a desired combination of elements for inclusion in data processing pipeline, and submit a processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of a data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, collaborative content creation services, simulation services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel, e.g., using a parallel computing platform 1030 (FIG. 10). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 918 implementing advanced processing and inferencing pipeline may be streamlined because each application may call upon the same inference service to perform one or more inferencing tasks.

In at least one embodiment, hardware 922 may include GPUs, CPUs, graphics cards, an AI/deep learning system (e.g., an AI supercomputer, such as NVIDIA's DGX™ supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, simulation, and visual computing, as non-limiting examples. In at least one embodiment, at least some of the computing environment of deployment system 906 and/or training system 904 may be executed in a datacenter or one or more supercomputers or high performance computing systems, with GPU-optimized software (e.g., hardware and software combination of NVIDIA's DGX™ system). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC™) may be executed using an AI/deep learning supercomputer(s) and/or GPU-optimized software (e.g., as provided on NVIDIA's DGX™ systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying a deployment pipeline, according to at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 906) may implemented in a cloud computing environment (e.g., using cloud 1026). In at least one embodiment, system 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public internet service providers (ISPs) that have been vetted or authorized for interaction.

In at least one embodiment, various components of system 1000 may communicate between and among one another using any of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines 1010 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004, similar to a first example described with respect to FIG. 9, may be used for a first machine learning model, training pipeline 1004, similar to a second example described with respect to FIG. 9, may be used for a second machine learning model, and training pipeline 1004, similar to a third example described with respect to FIG. 9, may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904, and may be implemented by deployment system 906.

In at least one embodiment, output model(s) 916 and/or pre-trained model(s) 1006 may include any types of machine learning models depending on embodiment. In at least one embodiment, and without limitation, machine learning models used by system 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines 1010; either in addition to, or in lieu of, AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s), e.g., facility 902. In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines 1010. In at least one embodiment, deployment pipelines 1010 may include any number of applications that may be sequentially, non-sequentially, or otherwise applied to feedback data (and/or other data types), including AI-assisted annotation, as described above. In at least one embodiment, as described herein, a deployment pipeline 1010 for an individual device may be referred to as a virtual instrument for a device. In at least one embodiment, for a single device, there may be more than one deployment pipeline 1010 depending on information desired from data generated by a device.

In at least one embodiment, applications available for deployment pipelines 1010 may include any application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface (UI) 1014 (e.g., a graphical user interface, a web interface, etc.) that may be used to select applications for inclusion in deployment pipeline(s) 1010, arrange applications, modify or change applications or parameters or constructs thereof, use and intera with deployment pipeline(s) 1010 during set-up and/or deployment, and/or to otherwise interact with deployment system 906. In at least one embodiment, although not illustrated with respect to training system 904, UI 1014 (or a different user interface) may be used for selecting models for use in deployment system 906, for selecting models for training, or retraining, in training system 904, and/or for otherwise interacting with training system 904. In at least one embodiment, training system 904 and deployment system 906 may include DICOM adapters 1002A and 1002B.

In at least one embodiment, pipeline manager 1012 may be used, in addition to an application orchestration system 1028, to manage interaction between applications or containers of deployment pipeline(s) 1010 and services 920 and/or hardware 922. In at least one embodiment, pipeline manager 1012 may be configured to facilitate interactions from application to application, from application to service 920, and/or from application or service to hardware 922. In at least one embodiment, although illustrated as included in software 918, this is not intended to be limiting, and in some examples pipeline manager 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of other application(s) or container(s). In at least one embodiment, communication, and cooperation between different containers or applications may be aided by pipeline manager 1012 and application orchestration system 1028. In at least one embodiment, so long as an expected input and/or output of each container or application is known by a system (e.g., based on constructs of applications or containers), application orchestration system 1028 and/or pipeline manager 1012 may facilitate communication among and between, and sharing of resources among and between, each of applications or containers. In at least one embodiment, because one or more of applications or containers in deployment pipeline(s) 1010 may share the same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, the scheduler may thus allocate resources to different applications and distribute resources between and among applications in view of requirements and availability of a system. In some examples, the scheduler (and/or other component of application orchestration system 1028) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 920 leveraged and shared by applications or containers in deployment system 906 may include compute services 1016, collaborative content creation services 1017, AI services 1018, simulation services 1019, visualization services 1020, and/or other service types. In at least one embodiment, applications may call (e.g., execute) one or more of services 920 to perform processing operations for an application. In at least one embodiment, compute services 1016 may be leveraged by applications to perform super-computing or other high-performance computing (HPC) tasks. In at least one embodiment, compute service(s) 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA®) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in the same location of a memory may be used for any number of processing tasks (e.g., at the same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1018 may be leveraged to perform inferencing services for executing machine learning model(s) associated with applications (e.g., tasked with performing one or more processing tasks of an application). In at least one embodiment, AI services 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) 1010 may use one or more of output models 916 from training system 904 and/or other models of applications to perform inference on imaging data (e.g., DICOM data, RIS data, CIS data, REST compliant data, RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services 1018.

In at least one embodiment, shared storage may be mounted to AI services 1018 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure appropriate machine learning model is loaded into a cache (e.g., shared storage), and/or a copy of a model may be saved to a cache. In at least one embodiment, the scheduler (e.g., of pipeline manager 1012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as the inference server is running as a different instance.

In at least one embodiment, during application execution, an inference request for a given application may be received, and a container (e.g., hosting an instance of an inference server) may be loaded (if not already loaded), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (turnaround time less than one minute) priority while others may have lower priority (e.g., turnaround less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provided through a queue. In at least one embodiment, a request is placed in a queue via an API for an individual application/tenant ID combination and an SDK pulls a request from a queue and gives a request to an application. In at least one embodiment, a name of a queue may be provided in an environment from where an SDK picks up the request. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) 1010. In at least one embodiment, GPUs 1022 may be leveraged by visualization services 1020 to generate visualizations. In at least one embodiment, rendering effects, such as ray-tracing or other light transport simulation techniques, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA® and/or QUADRO® GPUs) may include any number of GPUs that may be used for executing processing tasks of compute services 1016, collaborative content creation services 1017, AI services 1018, simulation services 1019, visualization services 1020, other services, and/or any of features or functionality of software 918. For example, with respect to AI services 1018, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of system 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX™) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC™) that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may be tasked with executing at least some of services 920 of system 1000, including compute services 1016, AI services 1018, and/or visualization services 1020, as described herein. In at least one embodiment, cloud 1026 may perform small and large batch inference (e.g., executing NVIDIA's TensorRT™), provide an accelerated parallel computing API and platform 1030 (e.g., NVIDIA's CUDA®), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

In at least one embodiment, in an effort to preserve patient confidentiality (e.g., where patient data or records are to be used off-premises), cloud 1026 may include a registry, such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, a number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, a process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

processing, using a speech model that comprises a neural network (NN) of artificial neurons, an audio input in a first language to generate one or more speech embeddings;

processing, using a speech adapter NN, the one or more speech embeddings to generate a first set of one or more tokens in a format associated with a language model (LM);

obtaining a second set of one or more tokens representing a text context associated with the audio input;

obtaining a third set of one or more tokens identifying a type of a speech-to-text conversion to be performed using the LM;

aggregating the first set of one or more tokens, the second set of one or more tokens, and the third set of one or more tokens to obtain an aggregated set of tokens; and processing, using the LM, the aggregated set of tokens to obtain an output including a speech-to-text conversion of the audio input.

2. The method of claim 1, wherein the text context comprises:

one or more keywords associated with the audio input.

3. The method of claim 1, wherein the text context is received from a speaker that generated the audio input.

4. The method of claim 1, further comprising:

identifying a subject area associated with the audio input; and assembling the text context from one or more entries that are stored in association with the identified subject area.

5. The method of claim 4, wherein the identifying the subject area associated with the audio input comprises:

receiving a preliminary output of the LM, the preliminary output generated in response to a preliminary input generated using the audio input.

6. The method of claim 1, wherein the speech-to-text conversion comprises at least one of:

a transcription of the audio input in the first language, or a translation of the audio input into a second language.

7. The method of claim 1, wherein processing the aggregated set of tokens comprises:

processing, using an LM adapter NN, a copy of the aggregated set of tokens to generate an adapter output; and combining the adapter output with an intermediate output of the LM.

8. The method of claim 1, wherein the NN of artificial neurons of the speech model comprises one or more conformer blocks.

9. The method of claim 1, wherein the adapter NN is trained after training of the LM.

10. A system comprising:

one or more processing units to generate, using a language model (LM) comprising an artificial neural network (ANN), a speech-to-text conversion of an audio input, the speech-to-text conversion generated and based at least on (i) a first processing, by the LM, of an aggregated input comprising a first portion generated based at least on a speech model processing the audio input and a second portion of the input representing contextual information associated with the audio input, (ii) a second processing, by an LM adapter ANN, of the aggregated input, and (iii) aggregation of outputs of the first processing and the second processing.

11. The system of claim 10, wherein the contextual information comprises:

one or more keywords associated with the audio input, and wherein the aggregated input further comprises:

a third portion identifying a type of the speech-to-text conversion to be performed using the LM.

12. The system of claim 10, wherein to process the audio input to generate the first portion of the input into the LM, the one or more processing units are to:

convert, using a speech adapter ANN, an output of the speech model into one or more tokens of a format associated with the LM.

13. The system of claim 10, wherein the system is comprised in at least one of:

an in-vehicle infotainment system for an autonomous or semi-autonomous machine;

a system for performing one or more simulation operations;
a system for performing one or more digital twin operations;
a system for performing light transport simulation;
a system for performing collaborative content creation for 3D assets;
a system for performing one or more deep learning operations;
a system implemented using an edge device;
a system for generating or presenting at least one of virtual reality content, mixed reality content, or augmented reality content;
a system implemented using a robot;
a system for performing one or more conversational AI operations;
a system implementing one or more large language models (LLMs);
a system implementing one or more language models;
a system for performing one or more generative AI operations;
a system for generating synthetic data;
a system incorporating one or more virtual machines (VMs);
a system implemented at least partially in a data center; or
a system implemented at least partially using cloud computing resources.

14. One or more processors to:
process, using a speech model that comprises a neural network (NN) of artificial neurons, an audio input in a first language to generate one or more speech embeddings;
process, using a speech adapter NN, the one or more speech embeddings to generate a first set of one or more tokens in a format associated with a language model (LM);
obtain a second set of one or more tokens representing a text context associated with the audio input;
obtain a third set of one or more tokens identifying a type of a speech-to-text conversion to be performed using the LM;
aggregate the first set of one or more tokens, the second set of one or more tokens, and the third set of one or more tokens to obtain an aggregated set of tokens; and
process, using the LM, the aggregated set of tokens to obtain an output including a speech-to-text conversion of the audio input.

15. The one or more processors of claim 14, wherein the text context comprises:
one or more keywords associated with the audio input.

16. The one or more processors of claim 14, wherein the one or more processors are further to:
identify a subject area associated with the audio input; and
assemble the text context from one or more entries that are stored in association with the identified subject area.

17. The one or more processors of claim 14, wherein the speech-to-text conversion comprises at least one of:
a transcription of the audio input in the first language, or
a translation of the audio input into a second language.

18. The one or more processors of claim 14, wherein to process the aggregated set of tokens, the one or more processors are further to:
process, using an LM adapter NN, a copy of the aggregated set of tokens to generate an adapter output; and
combine the adapter output with an intermediate output of the LM.

19. The one or more processors of claim 14, wherein the adapter NN is trained after training of the LM.

* * * * *